(12) United States Patent
Haimer

(10) Patent No.: US 9,901,988 B2
(45) Date of Patent: Feb. 27, 2018

(54) TOOL RECEPTACLE FOR A SCREW-IN TOOL

(71) Applicant: FRANZ HAIMER MASCHINENBAU KG, Igenhausen (DE)

(72) Inventor: Franz Haimer, Igenhausen (DE)

(73) Assignee: Franz Haimer Maschinenbau KG, Igenhausen (DE)

(*) Notice: Subject to any disclaimer, the term of this patent is extended or adjusted under 35 U.S.C. 154(b) by 232 days.

(21) Appl. No.: 14/403,213

(22) PCT Filed: Apr. 18, 2013

(86) PCT No.: PCT/EP2013/058046
§ 371 (c)(1),
(2) Date: Nov. 24, 2014

(87) PCT Pub. No.: WO2013/178401
PCT Pub. Date: Dec. 5, 2013

(65) Prior Publication Data
US 2015/0151365 A1 Jun. 4, 2015

(30) Foreign Application Priority Data

May 29, 2012 (DE) .................. 10 2012 104 606

(51) Int. Cl.
*B23B 31/11* (2006.01)
*B23C 5/10* (2006.01)

(52) U.S. Cl.
CPC ...... *B23B 31/1107* (2013.01); *B23B 31/1122* (2013.01); *B23C 5/10* (2013.01);
(Continued)

(58) Field of Classification Search
CPC ............ B23B 31/1122; B23B 31/1107; B23B 2240/00; B23B 2265/08; B23C 5/10; B23C 2210/02; B23C 2210/03; Y10T 279/17931
See application file for complete search history.

(56) References Cited

U.S. PATENT DOCUMENTS 364,080 A * 5/1887 Barber ................. B25G 1/00
279/103
1,615,233 A 1/1927 Redinger
(Continued)

FOREIGN PATENT DOCUMENTS

| CH | 238003 | 6/1945 | |
|---|---|---|---|
| DE | 3912503 A1 * | 3/1990 | ............ B23B 31/00 |

(Continued)

OTHER PUBLICATIONS

International Search Report dated Jun. 26, 2013 for PCT/EP2013/058046 with English translation.
(Continued)

*Primary Examiner* — Daniel Howell
*Assistant Examiner* — Paul M Janeski
(74) *Attorney, Agent, or Firm* — Paul D. Bianco; Katharine F. Davis Wong; Fleit Gibbons Gutman Bongini & Bianco PL

(57) ABSTRACT

A tool receptacle for a screw-in tool having a main body, which has a receiving region including at least one conical contact surface for supporting a corresponding conical support surface of the screw-in tool. For thread-protection and for tightening with high concentricity and low production outlay, an insert is disposed in the main body, the insert is movable transversely with respect to the longitudinal axis of
(Continued)

the main body and is rotationally-fixed with respect to the main body and has a mating thread for a thread on the screw-in tool.

15 Claims, 2 Drawing Sheets

(52) U.S. Cl.
CPC ....... *B23B 2240/00* (2013.01); *B23B 2265/08* (2013.01); *B23C 2210/02* (2013.01); *B23C 2210/03* (2013.01); *Y10T 279/17931* (2015.01)

(56) References Cited

U.S. PATENT DOCUMENTS

| | | | |
|---|---|---|---|
| 2,383,688 A * | 8/1945 | Seiter | B23B 51/04 279/8 |
| 4,083,571 A * | 4/1978 | Schadlich | B23B 31/1253 279/60 |
| 4,945,793 A | 8/1990 | von Haas | |
| 6,394,711 B1 * | 5/2002 | Brosius | B23C 5/10 279/8 |
| 6,494,648 B2 | 12/2002 | Harpaz | |
| 7,101,128 B2 | 9/2006 | Hansson | |
| 7,431,543 B2 | 10/2008 | Buettiker | |
| 7,753,628 B2 * | 7/2010 | Hecht | B23B 31/11 279/8 |
| 8,286,972 B2 | 10/2012 | Haimer | |
| 8,668,413 B2 | 3/2014 | Volokh | |
| 2005/0117987 A1 | 6/2005 | Hansson | |
| 2011/0123255 A1 * | 5/2011 | Frota de Souza Filho | B23B 29/046 403/24 |
| 2011/0123555 A1 | 5/2011 | Gant | |
| 2011/0211921 A1 | 9/2011 | Volokh | |
| 2012/0093602 A1 | 4/2012 | Osawa et al. | |
| 2012/0155981 A1 * | 6/2012 | Stojanovski | B23C 5/10 409/234 |

FOREIGN PATENT DOCUMENTS

| | | |
|---|---|---|
| DE | 4026651 | 2/1992 |
| DE | 10114240 | 1/2003 |
| DE | 60131981 | 12/2008 |
| DE | 102010055429 | 7/2011 |
| JP | 62-63002 | 3/1987 |
| JP | 2001-087929 | 4/2001 |
| JP | 2004-504162 | 2/2004 |
| JP | 2009-507652 | 2/2009 |
| JP | 2011-062787 | 3/2011 |
| WO | 02/14005 | 2/2002 |
| WO | 2003090959 | 11/2003 |

OTHER PUBLICATIONS

Result of Examination Report for DE 10 2012 104 606.9 filed May 29, 2012 (priority application).
International Preliminary Report on Patentability (IPRP) published Dec. 2, 2014 for International Patent Application No. PCT/EP2013/058046 filed on Apr. 18, 2013.
Written Opinion published Nov. 29, 2014 for International Patent Application No. PCT/EP2013/058046 filed on Apr. 18, 2013.
Excerpted letter from Japanese associate explaining Office Action for JP Patent Application 2015-514391, letter dated Apr. 6, 2017.
Office Action for JP Patent Application 2015-514391, dated Mar. 30, 2017.

* cited by examiner

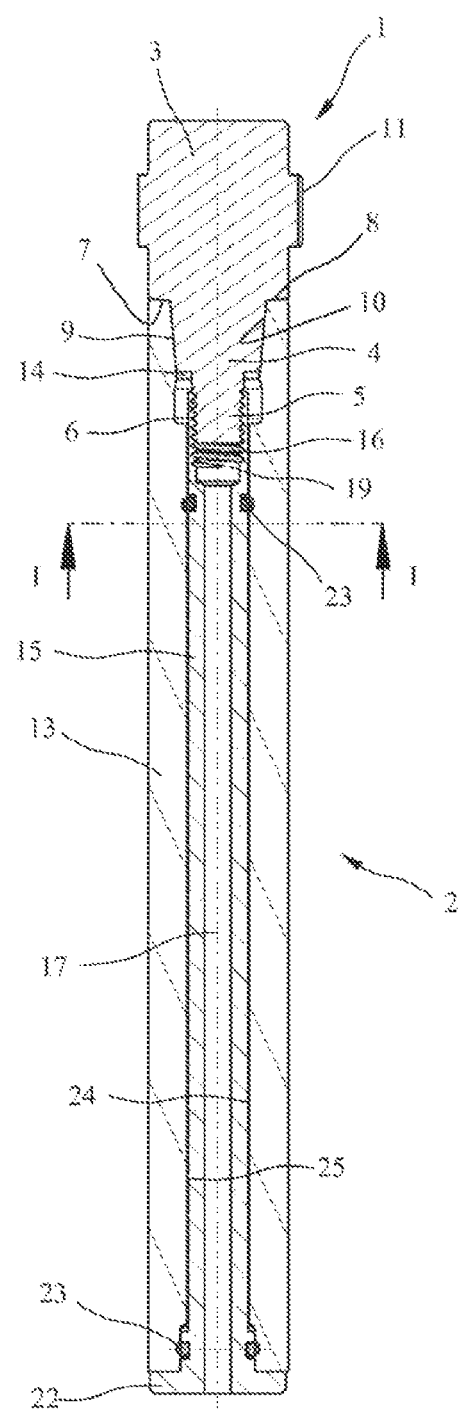

TOOL RECEPTACLE FOR A SCREW-IN TOOL

FIELD OF THE INVENTION

The invention relates to a tool receptacle for a screw-in tool and to a tool arrangement having a screw-in tool and such a tool receptacle.

BACKGROUND OF THE INVENTION

Tool receptacles intended for screw-in tools are already known, in which a generally cylindrical main body contains a receiving opening having a conical inner support surface for a corresponding outer contact surface of the screw-in tool. An internal thread for engaging with a corresponding external thread on the screw-in tool is usually provided in the main body. Since no radial compensation between the external thread on the screw-in tool and the associated internal thread on the tool receptacle is possible after centering by the conical support or contact surface, the tool receptacles and the corresponding screw-in tools must be produced with high precision in order to avoid an axial offset between the external and internal threads. Such an offset can cause strains during clamping and can thereby cause concentricity errors of the tools. An eccentric load can also cause damage to the threads, in addition to a deterioration of the concentricity properties. This is of particular importance for the screw-in tools, which generally consist of carbide or other hard materials, since an eccentric load on these tools can lead to damage relatively quickly.

SUMMARY OF THE INVENTION

The invention addresses the problem of creating a tool receptacle for a screw-in tool and a tool arrangement having a screw-in tool and such a tool receptacle, with which the thread is protected and clamping with high concentricity precision is made possible.

This problem is solved by a tool receptacle as disclosed herein. Expedient improvements and advantageous embodiments of the invention are also disclosed.

In the tool receptacle according to the invention, an insert is provided, which is movable transversely relative to the longitudinal axis of the main body and rotationally fixed in relation to the main body, and on which the thread for engagement with a corresponding mating thread on the screw-in tool is situated. The thread situated on the tool receptacle can thus adapt to the mating thread of the screw-in tool, for example if the center axes of the thread and the mating thread are not exactly aligned, whereby impairment of the concentricity precision or damage to the thread can be avoided. The insert is not fixedly arranged in the main body, but is instead floating and thereby offers a radial compensation possibility. This is particularly advantageous if a screw-in tool made of carbide is being used, because the danger of breaking the brittle material, particularly at the thread, is reduced by the compensation possibility.

In a particularly expedient embodiment, the insert is arranged with radial play inside the main body of the tool receptacle. The insert can thereby undergo a radial or tilting movement in order thereby to compensate for any possible offset between the thread on the screw-in tool and the associated mating thread on the tool receptacle. At least one damping element can be provided between the insert and the main body. Thereby the radial or tilting movement of the insert inside the main body can be damped. Moreover, the transmission of vibrations between the tool receptacle and the screw-in tool is also reduced by the damping element.

For rotationally fixed arrangement of the insert inside the main body, the insert can have a form-fitting connection to the main body. This can be accomplished by a defined shaping such as a spline profile, serrations, a polygonal profile or by additional elements such as feather keys, sliding keys or cross pins.

In a simple yet expedient embodiment, the form-fitting connection can be accomplished via a cross pin that runs through a transverse bore in the main body and a transverse bore in the insert.

The movability of the insert inside the main body can be guaranteed by an inside diameter of the transverse bore in the insert that is larger than the outside diameter of the cross pin. The movability of the cross pin can also be guaranteed by a bore in the main body that is larger than the diameter of the cross pin.

Another form-fit connection can be achieved by an insert having an external profile formed as a polygon for form-fitting engagement with a matching internal profile in the main body. The insert can have an external profile constructed as an external hexagon, for example, and can be arranged with a slight radial play in an internal profile in the shape of an internal hexagon in the main body.

In another advantageous embodiment, the receiving region of the main body has a plurality of conical contact surfaces. An improved support and guidance of the screw-in tool inside the tool receptacle can be achieved in that way. For example, the receiving region of the main body can have a first conical support surface arranged on the front end face of the main body for a first contact surface of the screw-in tool and a second conical support surface arranged in the interior of the main body for a second contact surface of the screw-in tool. The two conical contact surfaces can have identical or different cone angles. This enables a simple production, but it is also possible to design the conical contact surfaces for different tasks, such as good radial centering or good axial support, and to merely adjust the surfaces to the different design conditions.

The first conical contact surface of the screw-in tool, which adjoins the tool head, and the associated conical first support surface on the end face of the main body preferably have a relatively large cone angle. A cone angle of 140° to 179°, preferably 170°, has proved to be favorable. In a preferred configuration, the second conical contact surface on the screw-in tool adjoins this surface, and the associated second conical support surface on the main body adjoins the first conical support surface. This second contact surface and the corresponding second support surface preferably have a relatively small cone angle of 1° to 40°, preferably 10°. It is also possible, however, to provide a cylindrical intermediate region between the two conical surfaces, for example. A double cone of the type described having two different cone angles has the advantage that the small cone angle enables a good centering of the screw-in tool in the tool receptacle and the large cone angle allows an additional centering, but with sharply reduced spreading forces on the tool receptacle. In addition, the conical first contact surface increases the stiffness of the tool, because the tool cannot slide under radial stress.

The mating thread corresponding to the thread on the screw-in tool is preferably designed as an internal thread. However, it can also be designed as an external thread for engagement with a corresponding internal thread on the screw-in tool. The thread on the screw-in tool can be formed as a V-thread, a trapezoid thread, a square thread, a round thread, a buttress thread or the like.

The insert can be constructed as a short sleeve arranged completely inside the main body or can protrude past the rear end face of the main body and have an annular shoulder at the rear end facing the mating thread for contact with the rear end face of the main body.

BRIEF DESCRIPTION OF THE DRAWINGS

Additional details and advantages of the invention emerge from the following description of preferred embodiments with reference to the drawings. In the drawing:

FIG. 3 shows a second embodiment of a tool arrangement having a tool receptacle and a screw-in tool, in a longitudinal section; and FIG. 4 shows a sectional view along the line I-I of FIG. 3.

DETAILED DESCRIPTION OF THE INVENTION

Figure 1:
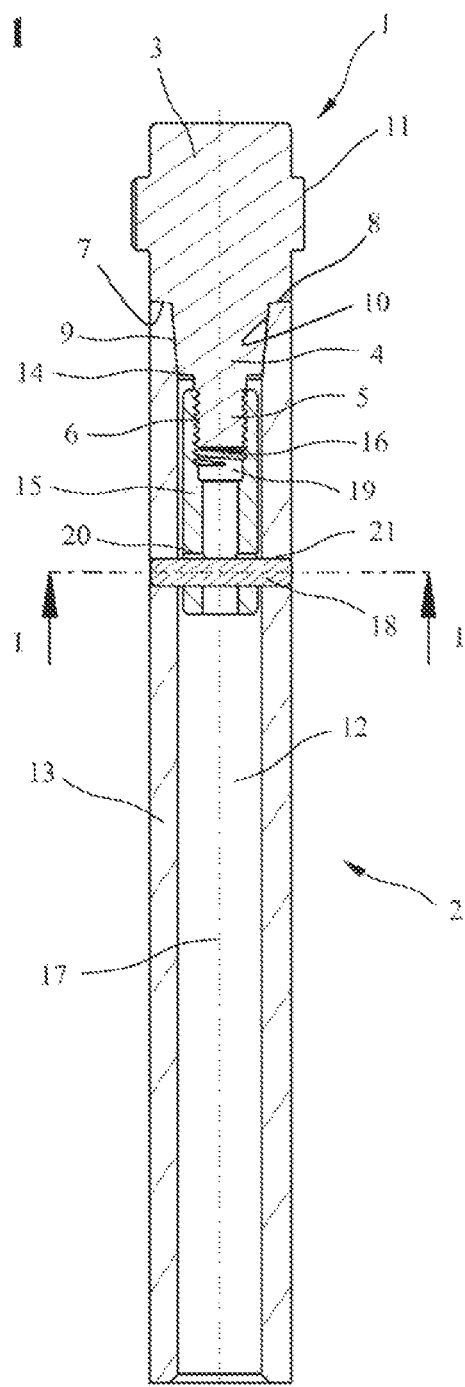
FIG. 1 shows a first embodiment of a tool arrangement having a tool receptacle and a screw-in tool, in a longitudinal section.

FIGS. 1 and 3 show two embodiments of a tool arrangement having a screw-in tool 1 and an associated tool receptacle 2, in a longitudinal section. The screw-in tool 1 has, for example, a tool head 3 constructed as a mill cutter, for example, a tool shank 4 tapering conically downward to the rear and a cylindrical mounting pin 5 with a thread 6 constructed here as an external thread.

Between the tool head 3 and the mounting pin 5, there is a supporting region with a first conical contact surface 7 for a corresponding first conical support surface 8 of the tool receptacle 2, and a second conical contact surface 9 for a second conical support surface 10 in the interior of the tool receptacle 2. The screw-in tool 1 is thus supported and guided inside the tool receptacle 2 via a double cone, which serves for an improved centering and an increased supporting effect.

On the outer side of the tool head 3, there are plural wrench faces 11 distributed across the periphery, which are used for screwing the screw-in tool 1 into the tool receptacle 2. The wrench surfaces 11 can also be used for automatic tool changing, however.

The tool receptacle 2 associated with the screw-in 1 tool contains a hollow cylindrical main body 13 furnished in this case with a through-opening 12, the main body having a front receiving region 14 with the first conical support surface 8 on the front end face of the main body 13 and the second conical support surface 10 in the interior of the main body 13. An insert 15, which has a mating thread 16 matching the thread 6 of the screw-in tool 1 and constructed in this case as an internal thread, is arranged in the main body 13. The insert 15 is arranged inside the main body 13 in such a manner that it is movable with a predetermined play transverse to the longitudinal axis 17 of the main body 13.

The tool receptacle 2 can be integrally constructed and can have an interface for connection to a machine spindle. However, the tool receptacle can also be designed in the form of an extension or an adapter piece, which is in turn clamped into an additional tool receptacle.

Figure 2:
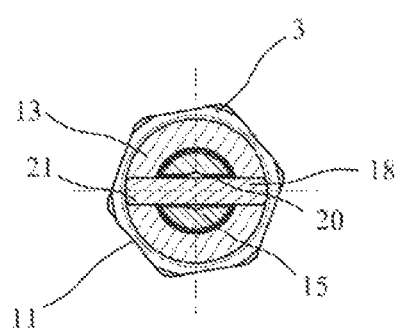
FIG. 2 shows a sectional view along the line I-I of FIG. 1.

In the embodiment shown in FIGS. 1 and 2, the insert 15 is arranged with a radial play inside the through opening 12 of the main body 13 and is secured in relation to the main body 13 by a cross pin 18. The insert 15 is designed as a sleeve having an annular cross section. The through-opening 12 of the main body 13 also has a circular cross section, but with a somewhat larger inside diameter than the outside diameter of the insert 15.

The sleeve-like insert 15 contains in the front part thereof a longitudinal bore 19 designed as a threaded bore having the mating thread 16 constructed as an internal thread. In the thread-free rear part of the sleeve-like insert 15, an internal transverse bore 20 for the cross pin 18 is provided. The cross pin 18 extends through a continuous outer transverse bore 21 in the main body 13 and the internal transverse bore 20 in the insert 15. While the cross pin 18 is mounted fixedly in the outer transverse bore 21 running through the main body 13, a play is provided between the inner transverse bore 20 in the insert 15 and the cross pin 18, so that the insert 15 can undergo a slight radial movement or a slight tilting movement inside the main body 13, but is nevertheless secured against rotation relative to the main body 13. Thereby the insert 15 does not rotate during screwing in of the screw-in tool 1, but can move or tilt radially to a slight extent and thereby adapt to the thread 6 of the screw-in tool 1.

In the embodiment shown in FIGS. 3 and 4, the insert 15, movable inside the main body 13 transversely to the longitudinal axis thereof, protrudes from the rear end face of the main body 13 and has, at the end opposite the mating thread 16, an annular shoulder 22 for contact on the rear end face. Because of the annular shoulder 22, the insert can be prevented from pulled outward towards the front toward the screw-in tool 1 while the screw-in tool 1 is being screwed in. In addition, a locking ring, not shown, or some other securing element, which prevents falling of the insert outward to the rear, can be arranged inside the main body 13. Upper and lower damping elements 23 visible in FIG. 3 are arranged between the insert 15 and the main body 13. The transverse movement of the insert 15 inside the main body 13, as well as the vibrations of the overall system, can be damped by means of the damping elements 23, designed as O-rings, for example.

The insert 15 shown in FIG. 3 can also be fixedly connected to the main body 13 in the region of the insert end opposite the thread, e.g. by screwing, adhesion, a press-fit or some other suitable connection. In such a design, the use of an annular shoulder 22 is not necessary and the insert 15 need not protrude out of the main body 13. In these cases, the insert 15 need only have a sufficient length to guarantee radial movability due to elastic bending. An additional anti-rotation protection can therefore be omitted.

According to FIG. 4, the insert 15 shown in FIG. 3 has an outer profile 24 constructed as an external hexagon for form-fitting engagement with an inner profile 25, constructed as an internal hexagon, of the main body. The inner profile 25 has somewhat larger dimensions than the outer profile 24, so that here, too, the insert 15 is arranged in the main body 13 so as to be movable radially, but is secured against rotation relative to the main body 13.

In the embodiment illustrated in FIGS. 1-4, the thread 6 of the screw-in tool 1 and the associated mating thread 16 of the tool receptacle 2 are constructed as V-threads. The thread 6 and the matching mating thread 16 can also be constructed as a trapezoid thread, a square thread, a round thread, a buttress thread or the like.

From FIGS. 1 and 3, it is evident that the first conical contact surface 7 adjoining the tool head 3 of the screw-in tool 1 and the associated conical first support surface 8 on the end face of the main body 13 preferably have a relatively large cone angle. A cone angle of 140° to 179°, preferably 170°, has proved to be favorable. The second conical contact surface 9 adjoins this first contact surface 7 of the screw-in tool 2. The second conical support surface 9 associated with the second conical contact surface 10 also adjoins the first support surface 8 of the main body 13. This second contact surface 9 and the corresponding second support surface 10 preferably have a relatively small cone angle of 1° to 40°, preferably 10°.

The invention claimed is:

1. A tool receptacle for a screw-in tool that is screwed into an insert, said tool receptacle comprising:
    a main body including a receiving region that includes at least one conical support surface for contact with a corresponding conical support surface of the screw-in tool; and
    an insert movable transversely to a longitudinal axis of the main body and secured against rotation in relation to the main body, said insert being arranged in the main body, and said insert including a matching thread for engaging a corresponding thread on the screw-in tool,
    wherein at least one damping element is arranged between the insert and the main body for damping transverse movement of the insert inside the main body and for damping vibrations between the insert and the main body.

2. The tool receptacle according to claim 1, wherein the insert is connected to the tool receptacle via a form-fitting connection.

3. The tool receptacle according to claim 1, wherein a first conical support surface is arranged on a front end face of the main body for a first of the conical support surfaces of the screw-in tool, and a second conical support surface is arranged in an interior of the main body for a second of the conical support surfaces of the screw-in tool.

4. The tool receptacle according to claim 1, wherein the matching thread on the insert is constructed as an internal thread for receiving the corresponding thread, which is constructed as an external thread, on the screw-in tool.

5. The tool receptacle according to claim 4, wherein the matching thread on the insert is constructed as a trapezoidal thread, a round thread, or a buttress thread.

6. A tool arrangement comprising:
    a tool receptacle according to claim 1; and
    a screw-in tool that includes a plurality of conical support surfaces for contacting the conical support surfaces of the tool receptacle.

7. The tool arrangement according to claim 6,
    wherein a first conical support surface of the tool receptacle is at a front end face of the main body, and a second conical support surface of the tool receptacle is in an interior of the main body,
    a first of the plurality of conical support surfaces of the screw-in tool contacts with the first conical support surface of the main body, and a second of the plurality of conical contact surfaces of the screw-in tool contacts with the second conical support surface in the interior of the main body, and
    the first of the plurality of conical support surfaces of the screw-in tool has a cone angle of 140° to 179°, and the second of the plurality of conical support surfaces of the screw-in tool has a cone angle of 1° to 40°.

8. The tool receptacle according to claim 1, wherein the insert protrudes from a rear end face of the main body, and includes, on a rear end, an annular shoulder for contacting the rear end face of the main body.

9. The tool receptacle according to claim 1, wherein the insert is arranged completely inside the main body, and is fixedly connected to the main body in a region opposite the thread.

10. The tool receptacle according to claim 1, wherein the insert is constructed as a sleeve arranged inside the main body so as to be movable with a predetermined play transverse to the longitudinal axis of the main body.

11. The tool receptacle according to claim 1, wherein a cone angle of a first conical support surface of the receiving region of the main body is about 170°.

12. The tool receptacle according to claim 11, wherein a cone angle of a second conical support surface of the receiving region of the main body is about 10°.

13. The tool receptacle according to claim 1, wherein a cone angle of a second conical support surface of the receiving region of the main body is about 10°.

14. A tool receptacle for a screw-in tool that is screwed into an insert, said tool receptacle comprising:
    a main body including a receiving region that includes at least one conical support surface for contact with a corresponding conical support surface of the screw-in tool; and
    an insert movable transversely to a longitudinal axis of the main body and secured against rotation in relation to the main body, said insert being arranged in the main body, and said insert including a matching thread for engaging a corresponding thread on the screw-in tool,
    wherein the insert is connected to the tool receptacle via a form-fitting connection, and
    wherein the insert has an external profile for form-fitting engagement with a corresponding internal profile in the main body.

15. The tool receptacle according to claim 14, wherein the external profile of the insert is constructed as an external hexagon and is arranged with a slight radial play in the internal profile constructed as an internal hexagon in the main body.

* * * * *